June 8, 1937.    R. P. JUTSON ET AL    2,083,382
REGULATED RECTIFIER CIRCUITS
Filed Dec. 21, 1935
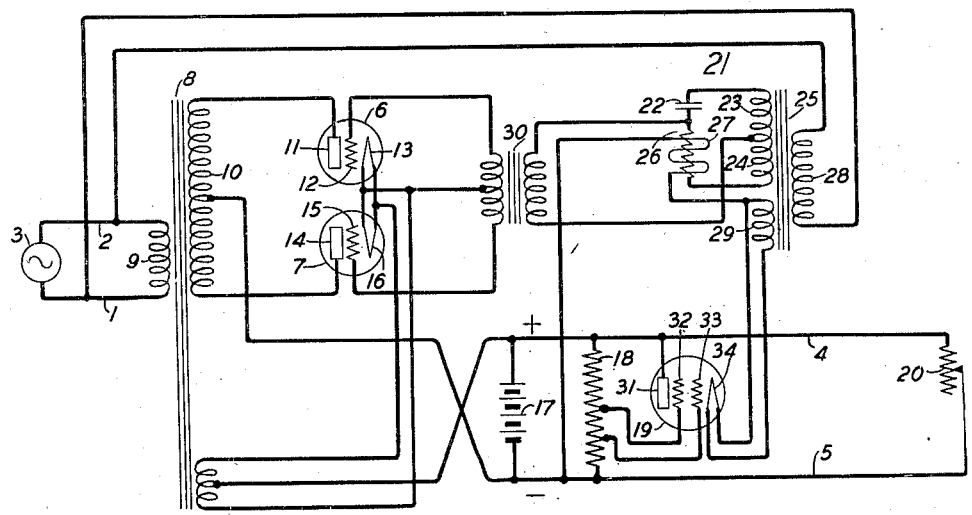
INVENTORS: R.P. JUTSON
D.E. TRUCKSESS
BY
Wayne B Wells
ATTORNEY

UNITED STATES PATENT OFFICE 2,083,382

REGULATED RECTIFIER CIRCUITS

Robert P. Jutson, North Tarrytown, and David E. Trucksess, New York, N. Y., assignors to Bell Telephone Laboratories, Incorporated, New York, N. Y., a corporation of New York Application December 21, 1935, Serial No. 55,560

7 Claims. (Cl. 175—363)

This invention relates to rectifier circuits and particularly to regulated rectifier circuits.

One object of the invention is to provide a three-element space discharge rectifier between an alternating current supply circuit and a load circuit that shall have the phase of the potential impressed on the grid varied in an improved manner with respect to the potential impressed on the plate to maintain the rectified voltage constant.

Another object of the invention is to provide a control circuit having a three-element space discharge rectifier connected between an alternating current supply circuit and a load circuit and a phase shifting bridge having one arm composed of a material with a negative temperature resistance coefficient and connected between the supply circuit and the grid of the rectifier that shall control the temperature of the bridge arm having a negative temperature resistance coefficient inversely according to the rectified voltage for governing the bridge and the rectifier to maintain the rectified voltage constant.

A further object of the invention is to provide a control circuit of the above-indicated type having a phase shifting bridge with an arm of silver sulphide that shall be heated inversely according to the rectified voltage.

When a rectifier is connected between an alternating current supply circuit and a load circuit it is desirable to have compensation made not only in accordance with the variation in the voltage of the supply circuit, but also in accordance with variations in the load on the load circuit so that the rectified voltage may be maintained substantially constant.

According to the present invention a three-element space discharge device which is preferably of the gas-filled type has the plate circuit thereof connected between an alternating current supply circuit and a load circuit. The load circuit may have a battery floated across it. The grid of the space discharge device is supplied with alternating potential from the supply circuit by means of a phase shifting bridge circuit. One arm of the bridge circuit is composed of silver sulphide which has a strong negative temperature resistance coefficient. The bridge arm composed of silver sulphide is heated inversely according to the rectified voltage for so shifting the phase of the potential impressed on the grid of the space discharge device with respect to the potential impressed on the plate as to maintain the rectified voltage constant. The heater for the silver sulphide bridge arm may be connected to the output circuit of a space discharge device having the input circuit thereof controlled according to the rectified voltage.

The single figure in the accompanying drawing is a diagrammatic view of a regulated rectifier circuit constructed in accordance with the invention.

Referring to the drawing a supply circuit comprising conductors 1 and 2 is connected to a suitable source of alternating current 3. A load circuit comprising conductors 4 and 5 is connected to the supply circuit by means of two rectifier space discharge devices 6 and 7 and a transformer 8. The transformer 8 comprises a primary winding 9 and a divided secondary winding 10. The space discharge device 6 is provided with an anode 11, a grid 12 and a cathode 13. The space discharge device 7 is provided with an anode 14, a grid 15 and a cathode 16. A battery 17 is floated across the load conductors 4 and 5 and a potentiometer 18 is provided for supplying potential to a control or regulator space discharge device 19. The load on the load conductors 4 and 5 may be of any suitable type and is diagrammatically illustrated as the adjustable resistance 20.

A phase shifting bridge circuit 21 is provided for connecting the grids 12 and 15 of the rectifier devices 6 and 7 to the supply conductors 1 and 2 and for varying the phase of the potential on the grids with respect to the potential on the plates or anodes 11 and 14 of the devices 6 and 7. The bridge 21 comprises a capacity arm 22, two inductive arms 23 and 24 in the form of a secondary winding of a transformer 25 and an arm 26 composed of silver sulphide which has a very pronounced negative temperature resistance coefficient. The arm 26 of the bridge 21 is provided with a heating coil 27 which is operated inversely in accordance with the rectified voltage on the load conductors 4 and 5. The silver sulphide arm 26 and the heating coil 27 are preferably enclosed in a vacuum tube in order not to be influenced by ambient temperature changes. Transformer 25 is provided with a primary winding 28 which is connected across the supply conductors 1 and 2. Another secondary winding 29 is provided for heating the filament of the control space discharge device 19. Two opposite vertices of the bridge 21 are connected to the grid circuits of the rectifier space discharge devices 6 and 7 by means of a transformer 30.

The control space discharge device 19 is provided with an anode 31 connected to the load conductor 4, a screen grid 32 connected to a tap from the potentiometer 18, a control grid 33 connected to a tap from the potentiometer 18 and a filament 34 which is heated by means of the secondary winding 29 on the transformer 25. The control grid circuit for the control tube 19 may be traced from the grid 33 through a portion of the potentiometer 18, load conductor 5, and the heating coil 27 to the filament 34 of the device 19. The drop caused by the heating coil 27 insures sufficient drop so that the grid 33 has a negative potential impressed on it with respect to the filament 34.

The space discharge devices 6 and 7 which are preferably gas-filled tubes operate as a full-wave rectifier for supplying rectified current to the battery 17 and the load circuit. If the voltage of this rectified current varies for any reason as for variation in supply circuit voltage or variations in load, the phase of the potential on the grids 12 and 15 with respect to the potential on the plates 11 and 14 is varied to control the rectified voltage. Varying of the phase on the grids 12 and 15 with respect to the potentials on the plates 11 and 14 is effected by controlling the temperature of the silver sulphide arm 26 of the phase shifting bridge 21. The temperature of the silver sulphide arm 26 is controlled by the heater coil 27 which is included in the output circuit of the control tube 19. The circuit for the heating coil 27 may be traced from the negative load circuit conductor 5 through the heating coil 27, cathode 34 and anode 31 of the tube 19 to the positive supply conductor 4 of the load circuit. The control grid 33 of the control tube 19 has a negative potential impressed on it with respect to the filament 34 and serves to so control the space discharge device 19 as to heat the coil 27 inversely in accordance with the changes of rectified voltage on the load conductors 4 and 5.

If the rectified voltage on the supply conductors 4 and 5 is increased, the negative potential on the grid 33 will be increased to decrease the current flow through the heater 27 and accordingly decrease the heating of the silver sulphide bridge arm 26. This increases the resistance of the arm 26 for so changing the phase of the potential impressed on the grids 12 and 15 with respect to the potential impressed on the plates 11 and 14 of the rectifier devices 6 and 7 as to reduce the rectified voltage on the load conductors 4 and 5. An opposite effect takes place if the rectified voltage falls below normal value. The above-described operation of the phase shifting bridge 21 having an arm composed of silver sulphide continues under the control of the space discharge device 19 to maintain the rectified voltage substantially constant.

Modifications in the circuits and in the arrangement and location of parts may be made within the spirit and scope of the invention, and such modifications are intended to be covered by the appended claims.

What is claimed is:

1. In combination, an alternating current supply circuit, a load circuit, two three-element rectifier devices connected between the supply circuit and the load circuit for supplying rectified current to the load circuit, means comprising a phase shifting bridge circuit connected between the supply circuit and the grids of said devices, one arm of said bridge being composed of silver sulphide having a negative temperature resistance coefficient and an extended resistance range, a coil for heating said arm of silver sulphide, a space discharge regulator device provided with a control grid and having a potential impressed on said grid according to the load circuit voltage, means for impressing the potential across said heating coil on said grid of the regulator device in opposition to the load circuit voltage, and means comprising said regulator device for heating said coil inversely according to the load circuit voltage to control said bridge and maintain the rectified voltage constant from no load to full load.

2. In combination, a load circuit, means comprising a three-element rectifier device for supplying rectified current to said load circuit, a phase shifting bridge connected to the grid circuit of said device for varying the phase of the grid potential with respect to the anode potential of said device, said bridge having one arm composed of silver sulphide having an extended resistance range, and means for heating said silver sulphide arm inversely according to the voltage across said load circuit to control said bridge and maintain the rectified voltage constant from no load to full load.

3. In combination, an alternating current supply circuit, a load circuit, a storage battery connected across said load circuit, means comprising two three-element rectifier devices connected to said supply circuit for supplying rectified current to said load circuit, a phase shifting bridge connected to said supply circuit and having one arm composed of silver sulphide, said silver sulphide arm having an extended resistance range, two vertices of said bridge being connected to the grid circuits of said devices, and means for heating said arm of silver sulphide inversely according to the potential across said load circuit to control the rectified voltage from no load to full load.

4. In a regulated rectifier, two three-element space discharge devices, a transformer connected to an alternating current supply circuit, a load circuit so connected to a secondary winding of said transformer by said devices as to be supplied with rectified current, a battery floated across said load circuit, means comprising a phase shifting bridge having one arm composed of silver sulphide having an extended resistance range for controlling the phase of the potential impressed on the grids of said devices with respect to the potential on the anodes of said devices to control the rectified voltage, and means comprising a heating coil for heating said arm of silver sulphide inversely according to the voltage across the load circuit to control said bridge circuit and maintain the rectified voltage constant from no load to full load.

5. In combination, an alternating current supply circuit, a storage battery, a load circuit connected to said battery, means comprising two three-element rectifier devices for supplying rectified current to said battery from the supply circuit, a phase shifting bridge connected between said supply circuit and the grid circuits of said devices, one arm of said bridge being composed of silver sulphide having an extended resistance range, and means comprising a heating coil for heating said silver sulphide arm inversely according to the voltage across said battery to control the bridge circuit and maintain the rectified voltage constant from no load to full load.

6. In combination, an alternating current supply circuit, a load circuit, a storage battery floated across said load circuit, means comprising a three-element rectifier device for supplying rectified current to said load circuit from the supply circuit, a phase shifting bridge connected between said supply circuit and the grid circuit of said rectifier device, said bridge having an arm of silver sulphide with an extended resistance range, a coil for heating said arm of silver sulphide, and means comprising a space discharge device controlled according to the potential across said load circuit for heating said coil inversely according to the load circuit voltage change to control said bridge and maintain the rectified voltage constant from no load to full load.

7. In combination, an alternating current supply circuit, a storage battery, a load circuit connected to said battery, means comprising a three-element rectifier device for supplying rectified current to said battery from the supply circuit, a phase shifting bridge having one arm composed of silver sulphide for connecting said supply circuit to the grid circuit of said rectifier device, a regulator space discharge device having the input circuit controlled according to the voltage across said battery, and means comprising a heating coil controlled according to the output from said space discharge device for heating said silver sulphide arm to govern said bridge and the rectifier device and maintain the load circuit voltage substantially constant from no load to full load.

ROBERT P. JUTSON.
DAVID E. TRUCKSESS.